United States Patent [19]
Wang et al.

[11] Patent Number: 5,232,584
[45] Date of Patent: Aug. 3, 1993

[54] METHOD AND APPARATUS FOR PURIFYING AND COMPACTING SOLID WASTES

[75] Inventors: Lawrence K. Wang; Mu H. S. Wang, both of Latham, N.Y.

[73] Assignee: International Environmental Systems, Inc., USA, Latham, N.Y.

[21] Appl. No.: 929,987
[22] Filed: Aug. 17, 1992

Related U.S. Application Data

[63] Continuation-in-part of Ser. No. 871,041, Apr. 20, 1992, which is a continuation-in-part of Ser. No. 551,543, Jul. 11, 1990.

[51] Int. Cl.$^5$ .................. B01D 53/34; B01D 53/14; B01D 11/14; B01D 33/64
[52] U.S. Cl. .................. 210/139; 210/141; 210/142; 210/143; 210/177; 210/178; 210/179; 210/180; 210/187; 210/188; 210/202; 210/205; 210/209; 210/218; 210/219; 210/220; 210/295; 210/251
[58] Field of Search .............. 210/138, 139, 143, 175, 210/177, 178, 179, 180, 187, 188, 202, 205–209, 218, 219, 220–221.2, 199, 295, 141, 142, 251

[56] References Cited

U.S. PATENT DOCUMENTS

| | | | |
|---|---|---|---|
| 3,165,465 | 1/1965 | Ray et al. | 210/53 |
| 3,429,442 | 2/1969 | Mackrle et al. | 210/202 |
| 3,623,982 | 11/1971 | Scott | 252/33.5 |
| 3,630,711 | 12/1971 | Burkert et al. | 71/34 |
| 3,698,558 | 10/1972 | Weber et al. | 210/256 |
| 3,760,881 | 9/1973 | Kiel | 166/308 |
| 3,887,470 | 6/1975 | Weber et al. | 210/261 |
| 3,969,076 | 7/1976 | Wang | 23/230 |
| 3,969,483 | 7/1976 | Stinson et al. | 423/305 |
| 3,992,149 | 11/1976 | Wang | 23/230 |
| 4,002,561 | 1/1977 | Traverse | 210/14 |
| 4,165,283 | 8/1979 | Weber et al. | 210/111 |
| 4,193,869 | 3/1980 | Bruckner et al. | 210/44 |
| 4,378,238 | 3/1983 | Goertz | 71/3 |
| 4,623,464 | 11/1986 | Ying et al. | 210/616 |
| 4,755,296 | 7/1988 | Ying et al. | 210/631 |
| 4,937,004 | 6/1990 | Mandrin et al. | 210/750 |
| 4,952,316 | 8/1990 | Cooley | 210/616 |
| 4,973,404 | 11/1990 | Weber et al. | 210/193 |
| 5,049,320 | 9/1991 | Wang et al. | 261/122 |
| 5,068,031 | 11/1991 | Wang et al. | 210/96.1 |
| 5,122,165 | 6/1992 | Wang et al. | 55/38 |
| 5,122,166 | 6/1992 | Hyrcyk et al. | 55/38 |

OTHER PUBLICATIONS

Screw Conveyor Corporation, "Experience in Motion," Chemical Equipment, Information No. 577, p. 112, Nov. 1991.
M. Krofta and L. K. Wang, "Sludge Thickening by Flotation or Lagoon," Journal New England Water Works Association, pp. 277–278, Sep. 1985.
L. K. Wang, M. H. S. Wang and F. M. Hoagland, "Reduction of Color, Odor, Humic Acid, and Toxic Substances by Adsorption, Flotation and Filtration", Water Treatment, vol. 7, pp. 1–16, 1992.
Scranton Gillette Communications, Inc., Water & Wastes Digest, 1992 Buyer's Guide, Front Cover, #1107, Jul. 1992.

Primary Examiner—Stanley S. Silverman
Assistant Examiner—Neil M. McCarthy

[57] ABSTRACT

The present invention relates to a multi-stage, single reactor, purification system for disinfecting, washing, and concentrating solid wastes, which include contaminated soil, highly concentrated biosolids, spent animal bedding, and spent diapers, etc.

A solid waste is fed into the reactor of this invented apparatus. At least one disinfecting and chemical agent (including cationic surface active agent known as quaternary ammonium compound) is fed together with water (as needed) into this reactor to disinfect and process said solid waste with the assistance of a mechanical mixing means inside said reactor. A disinfecting gas is fed to the same reactor as needed. After the period of feeding, disinfecting, processing, and mixing is over, the process water is drained. The disinfected and processed wet solid waste is discharged to an expulsion chamber means which removes residual water and compacts the disinfected and processed solid waste.

The drained process water and the removed residual water are discharged either into a municipal sewer system for proper disposal, or into a chemical neutralizer means for pretreatment before its sewer discharge, or for production of a fertilizer aid containing nitrogen and phosphorus.

12 Claims, 7 Drawing Sheets

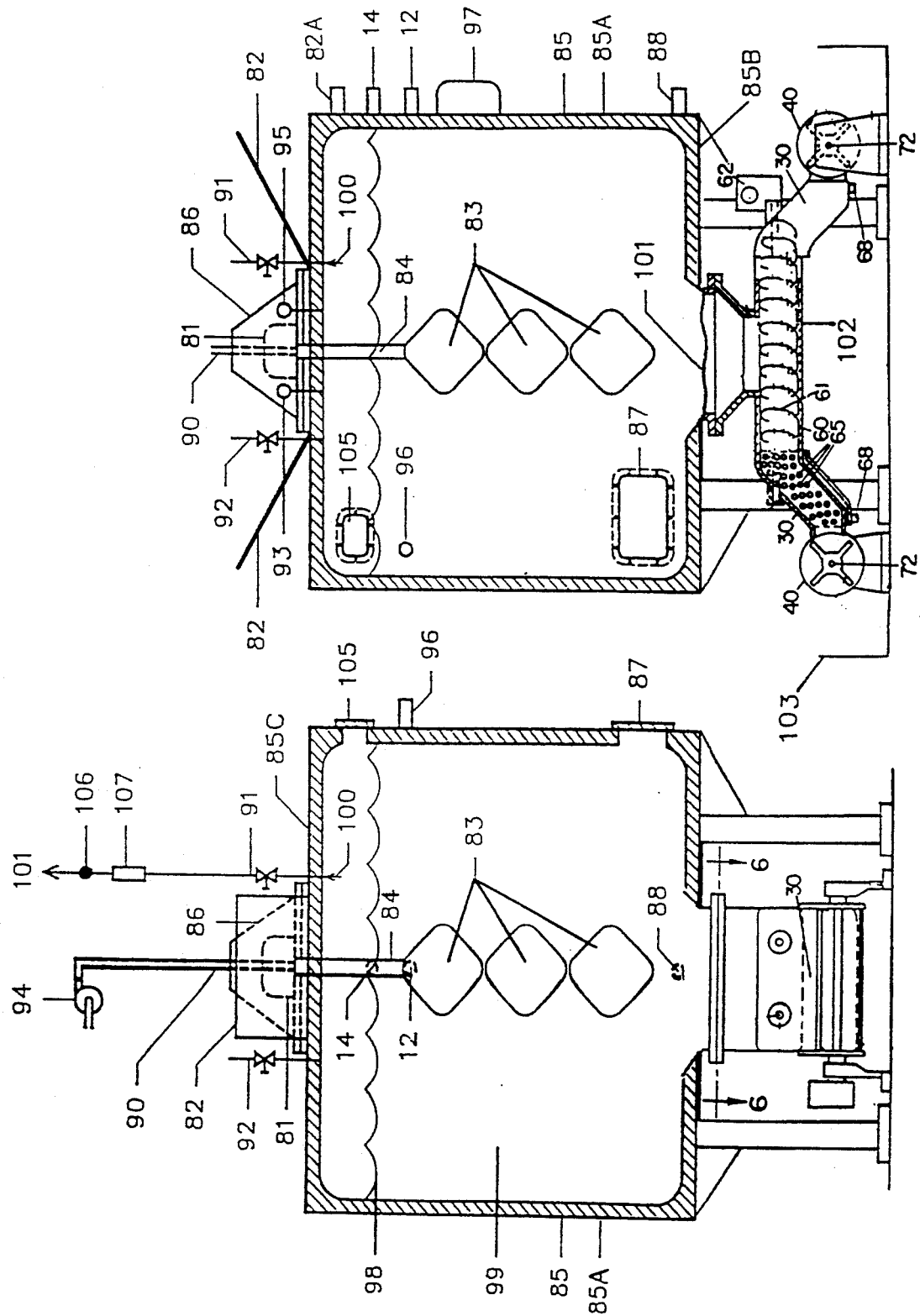

METHOD AND APPARATUS FOR PURIFYING AND COMPACTING SOLID WASTES

This patent application is a continuation-in-part of application Ser. No. 07/871,041, filed Apr. 20, 1992, which is in turn a continuation-in-part of application Ser. No. 07/551,543, filed Jul. 11, 1990, now pending.

BACKGROUND OF THE INVENTION

1. Field of the Invention

The present invention relates to killing pathogenic microorganisms, removing contaminants and water from solid wastes so that the disinfected, washed and dewatered solid waste can be reclaimed, recycled or discharged into a sanitary landfill site for ultimate disposal. More particularly, the present invention relates to a multi-stage, single reactor, purification system for removing pathogenic microorganisms and contaminants from solid wastes.

2. Description of the Prior Art

The use and preservation of our natural and environmental resources continues to present conflicting priorities. On the one hand, there is the municipal, industrial, commercial, military and residential priority of growth, resulting in the dumping or discharging of contaminated solid wastes, such as contaminated soils, spent animal bedding, spent diapers, onto our land. On the other hand, the priority of preserving our environment and conserving our resources cannot be left unchecked. The complexities and costs for preserving our environment and conserving our resources have escalated to a point where disposal of hazardous, infectious, and toxic solid wastes by conventional pollution control apparatus and systems is stifling municipal, industrial, commercial, military, and residential growth. A balance between human progress and environmental conservation can be achieved only by further development of innovative pollution control apparatus and systems which are both cost-effective, and technically efficient.

The soil contaminated by the leaking underground storage tanks, accidental hazardous spills, and illegal dumping can not be remediated by conventional processes, such as soil venting, stabilization and fixation, washing and incineration. Soil venting is effective only when the soil is contaminated by volatile organic compounds (VOCs). Stabilization and fixation process is very expensive and is effective only for stabilizing and fixing certain hazardous substances. Conventional soil washing is practiced in conjunction with hydrocyclones and froth flotation, and is not effective for washing out infectious microorganisms. Incineration is another conventional process for reclamation of contaminated soil which is very effective, very expensive and frequently causes air pollution problems.

So far there has been no cost-effective process or apparatus for proper disposal of solid wastes from hospitals, clinical laboratories, biological laboratories and animal research institutions. Their solid wastes are generally labeled as "bio-hazardous" and disposed of by at least one of the following methods: (a) proper commercial transportation and sanitary disposal; (b) in-house incineration; (c) in-house sterilization and commercial sanitary disposal; (d) in-house sterilization and municipal sanitary disposal; (e) unsafe municipal disposal; (f) unsafe commercial disposal; (g) illegal dumping; and (h) unsafe or illegal landfill. Of the aforementioned options for disposal of bio-hazardous solid wastes, the first method (proper commercial transportation and sanitary disposal) is technically feasible, but economically unfeasible. All other methods are questionable.

The present invention involves the use of cationic surface active agents (cationic surfactants) and other disinfectants for disinfecting and cleaning a contaminated solid waste, and the use of mixing and expulsion means for processing and dewatering said solid waste.

While many cationic surface active agents are effective for disinfecting and cleaning solid wastes, the preferred cationic surface active agents to be used in this invention are quaternary ammonium compounds which may be regarded as equivalent to a substituted ammonium chloride salt molecule that has all four hydrogen atoms replaced by organic radicals. However, there is a difference in chemical characteristics. Ammonium chloride is a salt of a strong acid and a weak base, while organic quaternaries are salts of a strong acid and a strong base. Although common quaternary salts to be used in this invention are chlorides, there may be exceptions.

Said quaternary ammonium compounds, being cationic surface active agents, are compatible with nonionic materials and other cationic materials.

Said quaternary ammonium compounds are water soluble to varying degrees and generally insensitive to the presence of low concentrations of water soluble mineral salts; said quaternary ammonium compounds are not precipitated by hardness in water. With organic anionic materials, such as soaps, alkyl aryl sulfonates or other anionic synthetic detergents, an insoluble quaternary ammonia salt is formed by neutralization.

Said quaternary ammonium compounds of this invention all lower surface tension of water effectively and all have strong hydrophilic character, which are important properties for said quaternary ammonium compounds to be used for wetting, emulsifying, and cleaning solid wastes.

The quaternary ammonium compounds as well as other cationic surface active agents can be quantitatively determined by the methods invented by Lawrence K. Wang (U.S. Pat. No. 3,969,076, Jul. 13, 1976; U.S. Pat. No. 3,992,149, Nov. 16, 1976).

Treatment of wells with fluids containing a quaternary ammonium compound and other complexes was invented by Othar Kiel (U.S. Pat. No. 3,760,881; Sept. 25, 1973). A calcium base grease containing a quaternary ammonium compound and lead naphthenate for rust inhibiting was disclosed by William Scott on Nov. 30, 1971 (U.S. Pat. No. 3,623,982).

U.S. Pat. No. 3,165,465, which was issued to Charles L. Ray et al on Jan. 12, 1965, relates to the use of quaternary ammonium compounds for flocculation and settling of liquid suspensions of finely divided minerals. The present invention relates to the use of quaternary ammonium compounds for disinfection and cleaning of slid wastes.

A pressurized device which was developed by Svatopluk Mackrle et al on Feb. 25, 1965 (U.S. Pat. No. 3,429,442) for treatment of liquid contains several zones within a vessel in which a sedimentation and dewatering zone surrounds a sludge blanket zone, which in turn, surrounds a filter bed zone. The present invention relates to an enclosed, but not pressurized, reactor for treatment of solid wastes.

Burkert et al discovered that the addition of small quantities of aliphatic organic amine compounds (cationic surface active agents) to ammonium polyphosphate solutions produced from wet process superphosphoric acid and ammonia brings about a flotation of carbonaceous chars in a surface froth, and that the bulk of the carbonaceous material can thus be removed in the froth, in accordance with the U.S. Pat. No. 3,630,711 issued to them on Dec. 28, 1971. Another U.S. Pat. No. 3,969,483, which was issued to John M. Stinson et al on Jul. 13, 1976, also relates to removal of carbonaceous matter from ammonium polyphosphate liquids using aliphatic amine and quaternary ammonium compound. In the invention of Stinson et al, the particulate carbonaceous matter and a minor portion of the input ammonium polyphosphate liquid are withdrawn from the top of the separation vessel and processed into fluid or solid fertilizers. In the present invention, the added quaternary ammonium compounds react with organic anionic materials (such as soaps, alkyl aryl sulfonates or other anionic snythetic detergents) to form insoluble quaternary ammonium salts which are used as fertilizer fillers because of their high nitrogen content. However, the phosphorus content of the present invention's insoluble quaternary ammonium varies with varying the solid wastes to be treated.

In accordance with Harvey M. Goertz's invention (U.S. Pat. No. 4,378,238, Mar. 29, 1983), a controlled release particulate composition can be prepared by the reaction of urea and formaldehyde comprising polymeric nitrogen in the form of methylene urea polymers of varying chain length. Goertz's invention does not relate to quaternary ammonium compounds.

Roland E. Weber et al were awarded three U.S. Patents, one on Apr. 29, 1971 (U.S. Pat. No. 3,698,558), one on Oct. 31, 1973 (U.S. Pat. No. 3,887,470) and one on Mar. 29, 1977 (U.S. Pat. No. 4,165,283), and all said three U.S. Patents are concerned with anti-pollution devices for removing deleterious particles and matter from liquid, using purification means, collection means and compaction means. The purification means of U.S. Pat. Nos. 3,698,558 and 4,165,283 is filtration; while the purification means of U.S. Pat. No. 3,887,470 is sedimentation. The present invention relates to disinfection, cleaning, collection and dewatering of solid wastes, using cationic surface agents (including mainly quaternary ammonium, compounds), and chemical disinfectants (ozone, chlorine, hypochlorite, peroxide, permanganate), and is not concerned with filtration.

An aerobic sewage treatment method and apparatus for use with a conventional septic system collection tank was patented by Charles Traverse (U.S. Pat. No. 4,002,561; Jan. 11, 1977), whose invention relates to mixing and aeration for stimulation biological reactions in a vessel. The present invention relates to mixing and gas distribution for generation chemical disinfection reactions or anaerobic biochemical reactions in a vessel.

A wastewater and solid processing system invented by Milton Bruckner et al on Mar. 18, 1980 (U.S. Pat. No. 4,193,869) relates to air bubbling, filtration and chlorination (disinfection). The present invention does not relate to air bubbling and filtration Two inventions by Wei-Chi Ying et al (U.S. Pat. Nos. 4,623,464, Mar. 21, 1985; and 4,755,296, Jul. 5, 1988) relate to air bubbling, mixing, aerobic biological reactions, and physical adsorption in open vessels for liquid treatment. The present invention, however, relates to mixing, gas distribution of disinfecting gases (instead of air), disinfection reactions for killing microorganisms, anaerobic biochemical reactions (instead of aerobic biological reactions), in enclosed vessels (instead of in open vessels).

The method for the deoxidation of chlorinated water, more particularly sea water, by means of a low oxygen content stripping gas was patented by Charles Mandrin on Jun. 26, 1990 (U.S. Pat. No. 4,937,004). The wastewater from the enclosed reactor and the expulsion chamber means of this invention contents quaternary ammonium compounds and/or other disinfectants and is to be treated by chemical reduction and neutralization (instead of gas stripping).

An improved gas dissolving and releasing system involving the use of multi-stages of porous gas dissolving media at the center and near the wall of a pressure vessel was patented by Lawrence K. Wang et al (U.S. Pat. No. 5,049,320; Sept. 17, 1991). Although there are many similarities between the U.S. Pat. No. 5,049,320 and the present invention, there are many dissimilarities between the two. The present invention relates to slid waste disinfection and dewatering in an enclosed, but not pressurized, reactor.

A sludge treatment multi-stage process and apparatus thereof for sludge concentration and liquid stream treatment was disclosed by Lawrence K. Wang et al in their U.S. Pat. No. 5,068,031, issued on Nov. 26, 1991. Although many technologies used in the U.S. Pat. No. 5,068,031 are similar to that used in the present invention, such as solids-water separation, multi-stage process operation, solid concentration, gas distribution, mixing, etc., the present invention relates to a completely different apparatus and a different process. The present invention is concerned with a solid waste treatment multi-stage process and apparatus thereof for solid waste disinfection and concentration.

Removal of volatile compounds and surfactants (including quaternary ammonium compounds) from liquid was disclosed by Lawrence K. Wang et al in their U.S. Pat. No. 5,122,165, issued Jun. 16, 1992. Their Wang process system invovles pumping, gas stripping in an enclosed reactor, foam collection, wet scrubbing, carbon adsorption, and carbon regeneration. The present invention relates to slid waste disinfection in an enclosed reactor, solid waste dewatering in an expulsion chamber means, and wastewater treatment in a chemical reduction and neutralization means.

One of quaternary ammonium compounds (cetyl dimethyl benzyl ammonium chloride), known as CDBAC or CETOL, was demonstrated by Lawrence K. Wang et al (Water Treatment, Volume 7, pages 1-16, 1992) to be an effective disinfectant. Another quaternary ammonium compound (alkyl dimethyl benzyl ammonium chloride), known as ADBAC or ARQUAD B-100, exhibits effective microbidical activity against various organisms such as molds, algae, and bacteria.

It is, therefore, an object of the present invention, to provide a new and improved purification system which kills pathogenic microorganisms, and removes contaminants and water from solid wastes, so that the disinfected, decontaminated, and dewatered solid waste can be sanitarily disposed of by landfill or reclaimed for reuse.

Another object of the present invention is to provide a pretreatment apparatus which is useful for hospitals, clinical laboratories, biological laboratories, and animal research institutions to pretreat their bio-hazardous solid wastes.

Still another object of the present invention is to provide a solid waste pretreatment apparatus which provides a compact, single vessel, and involves a multistage operation.

A further object of the present invention is to provide a relatively inexpensive, fully automatic, easy to operate solid waste purification system.

Another object of the present invention is to provide a solid waste purification system in processes where especially disinfected solid materials are required.

A still further object of the present invention is to salvage the contaminated solid material (such as soil) for reuse as the agricultural top soil, and to salvage the processed water containing nitrogen and phosphorus as the fertilizer.

A still further object of the present invention is to develop a biological flotation process for thickening of biosolids (including but not being limited to activated sludge) by an anaerobic sequencing biological reactor of this invention.

SUMMARY OF THE INVENTION

In accordance with the present invention, an improved process system for purifying and compacting solid wastes comprises the following steps (FIG. 8):

(a) opening an inlet door or an inlet pipe of an enclosed reactor, and placing a solid waste manually or mechanically into said enclosed reactor which is equipped with said inlet door, side walls, a bottom, a top, a cold water inlet pipe, a hot water inlet pipe, a water outlet pipe, water drains, a gas inlet pipe, a gas outlet pipe, a gas release valve, a mixing and gas distribution means, a chemical dispenser means, a vacuum/pressure gauge, a gas feeder, a timer control means, a temperature gauge, and a water pump, (b) adjusting water temperature and water level inside said enclosed reactor until a predetermined water temperature and a predetermined water level inside said enclosed reactor is reached, thereby producing a mixture of water and solid waste, (c) continuously mixing said mixture of water and solid waste inside said enclosed reactor with said mixing and gas distribution means, (d) batchwise feeding at least one chemical through said chemical dispenser means, into said mixture of water and solid waste inside said enclosed reactor, (e) being sure that said inlet door is closed, (f) feeding, when necessary, a gas with said gas feeder, into said mixture of water and solid waste inside said enclosed reactor, through said gas inlet pipe and said mixing and gas distribution means, and discharging the gas effluent to ambient air through a gas neutralizer (containing at least one neutralizing chemical) and a gas monitor, until a predetermined gas reaction period is reached, (g) stopping mixing by turning off said mixing and gas distribution means, (h) separating said solid waste from said mixture of water and solid waste inside said enclosed reactor by gravitational and/or centrifugal force, thereby producing a separated solid waste and a separated water, (i) transporting the separated solid waste to an expulsion chamber means for dewatering said separated solid waste, thereby producing a dewatered solid waste and a wastewater, (j) discharging the dewatered solid waste from said expulsion chamber means into a storage means, and (k) draining said separated water and said wastewater through said water outlet pipe and said water drains, to a chemical neutralizer means for neutralization and treatment using a neutralizing chemical, and for subsequent discharge.

Still in accordance with the present invention, a complete apparatus for purifying and dewatering an infectious and hazardous solid waste comprises in combination:

(a) an enclosed reactor comprising an enclosure (including a top, side walls, and a bottom) thereof as an outside wall of said apparatus, an inlet door and in inlet pipe on or near the top thereof for receiving said solid waste, and means for purifying and separating said solid waste; and thereby producing a separated solid waste and a separated water, (b) a water pump and a hot water inlet pipe connected to said enclosure for feeding hot water into said enclosed reactor, (c) said water pump and a cold water inlet pipe connected to said enclosure for feeding cold water into said enclosed reactor, (d) said water pump and a water outlet pipe connected to said enclosure for discharging said separated water from said enclosed reactor, to a chemical neutralizer, (e) a gas inlet pipe and a gas feeder both connected to said enclosure for feeding a gas or a gas mixture into aid enclosed reactor, (f) a chemical dispenser means connected to said enclosure for dispensing and feeding a predetermined amount of chemical into said enclosed reactor, (g) a mixing and gas distribution means positioned inside said enclosed reactor for mixing said water, said solid waste, and said chemical, and for distributing/mixing said gas or gas mixture inside said enclosed reactor, in turn, for purifying said solid waste, (h) a gas release valve connected to said enclosure for discharging an excess amount of said gas into a gas neutralizer under condition that a predetermined pressure for operating said enclosed reactor has been exceeded, (i) a vacuum/pressure gauge connected to said enclosed reactor for determining pressure or vacuum inside said enclosed reactor, (j) a gas outlet pipe connected to said enclosure for exiting said gas from said enclosed reactor, (k) a gas neutralizer connected to said gas outlet for neutralizing said gas (using at least one neutralizing chemical) from said enclosed reactor, thereby producing a neutralized gas, (l) a gas monitor connected to said gas neutralizer for monitoring the residual toxic contaminants of said neutralized gas before discharging said neutralized gas into ambient air environment, (m) said water pump connected to said enclosure, hot water inlet pipe, cold water inlet pipe, water outlet pipe and water drains for transporting said water to, within or from said apparatus, (n) an expulsion chamber means directly or indirectly connected to said enclosed reactor, for receiving and dewatering said separated solid waste from said enclosed reactor, thereby producing a dewatered solid waste and a wastewater, (o) a storage means connected to said expulsion chamber means for receiving and storing the dewatered solid waste, (p) said chemical neutralizer means connected to said water outlet pipe and water drains for receiving and treating said separated water and said wastewater using at least one neutralizing chemical, and for subsequently producing and discharging the neutralized and treated water, (q) a timer control means mounted on said enclosure and electronically and/or electrically connected to said water pump, said gas feeder, said chemical dispenser means, said mixing and gas distribution means, said expulsion chamber means, and said chemical neutralizer means for automatic or semi-automatic control of said apparatus at different operating cycles in a sequence, each cycle with predetermined and preprogrammed time interval, and (r) a temperature gauge mounted on said enclosure, and connected to said enclosed reactor with thermal couple for determining the water temperature inside said enclosed reactor.

BRIEF DESCRIPTION OF THE DRAWINGS

The present invention will become more fully understood from the detailed description given herein below and the accompanying drawings which are given by way of illustration, and thus are not limitative of the present invention, and wherein:

FIG. 1 presents the front view, while

FIG. 2 presents the side view of an apparatus which is equipped with square mixing paddles top-and-center as well as vertically mounted on a mixing and gas distribution means of said apparatus, according to the present invention;

DESCRIPTION OF THE PREFERRED EMBODIMENTS

Figure 3A:
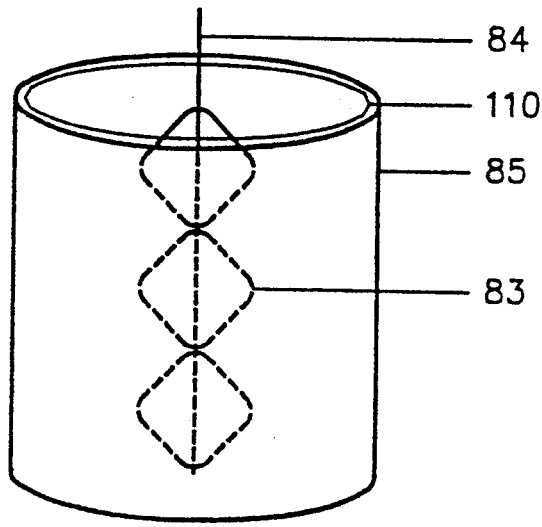
FIG. 3A shows a set of square shape mixing paddles which are top-and-center as well as vertically mounted on a mixing and gas distribution means of said apparatus, according to the present invention.

The heart of this invention relates to conversion of an infectious solid waste into a noninfectious solid waste with a special chemical, so the cost for overall waste disposal can be significantly reduced.

The special chemical of this invention includes: cationic surface active agent, hypochlorite, bromine, permanganate, peroxide, acid, base, additives, neutralizing chemicals, or combinations thereof.

Conventional surface active agents used in formulation of detergents or wetting agents are anionic and nonionic in nature. Anionic and nonionic surface active agents are excellent chemicals for wetting and cleaning, but are not disinfectants. The cationic surface active agents of this invention are excellent disinfectants as well as detergents. The pathogenic microorganisms and toxic substances attached on said infectious solid waste can be properly disinfected and removed by the cationic charges and low surface tension of said cationic surface active agents.

The microbicidal properties of all quaternary ammonium compounds which are cationic surface active agents result from their structural balance between hydrophilic and hydrophobic groups. This is demonstrated by the ability of quaternary ammonium compounds to alter biological structures such as microbial cell membranes by the destruction of ionic bonds. Normally, quaternary ammonium compounds are further diluted at time of use. An effective use dilution of alkyl dimethyl benzyl ammonium chloride (known as ADBAC or ARQUAD B-100) for control of staphylococcus aureaus and salmonella choloraesuis is 400 ppm (based on 100% active). ADBAC is an effective sanitizing solution for food processing equipment at 200 ppm concentration. Effective killing dilutions for four species of microorganisms are shown below:

| Microorganism | Killing Dilution |
| --- | --- |
| Staphylococcus aureus | 1:56,000 |
| Salmonella typhosa (s. typhi) | 1:53,000 |
| Escherichia coli | 1:31,000 |
| Pseudomonas aeruginosa | 1:20,000 |

Another cationic surfactant as well as quaternary ammonium compound which has been extensively studied by the inventors is cetyl dimethyl benzyl ammonium chloride (known as CDBAC or CETOL). Other quaternary ammonium compounds covered by this invention are listed in Table 1. It is important to note that the "chloride" of all quaternary ammonium compounds listed in Table 1 may be replaced by "bromide", "iodided", "fluoride", "nitrite", "nitrate", or "sulfate", and the new quaternary ammonium compounds with "bromide", "iodide", "fluoride", "nitrite", "nitrate", or "sulfate" are also effective disinfectants and wetting agents to be adopted by the present invention.

FIGS. 1 and 2 show the front view and side view, respectively, of an apparatus in accordance with this invention.

In operation, an inlet door 82 of an enclosed reactor 85, shown in FIG. 1 and FIG. 2, is opened, so a solid waste (not shown) can be manually or mechanically fed into said enclosed reactor 85 which comprises at least said inlet door 82, side walls 85A, a bottom 85B, a top 85C and 86, a cold water inlet pipe 14, a hot water inlet pipe 12, a water outlet pipe 88, water drains 6, a gas release valve 92, a mixing and gas distribution means 83, a chemical dispenser means 105, a vacuum/pressure gauge 93, a gas feeder 94, a timer control means 95, a temperature gauge 96, and a water pump 97.

The same pump 97 is used for feeding hot water through said hot water inlet pipe 12, or feeding cold water through said cold water inlet pipe 14, into said enclosed reactor 85, based on a predetermined water temperature, which is monitored by said temperature gauge 96. Feeding hot and/or cold water is continued until a predetermined water level 98 is reached, so there is a mixture of water and solid waste 99 inside said enclosed reactor 85.

Said mixing and gas distribution means 83 inside said enclosed reactor 85 is then turned on to mix said mixture of water and solid waste 99. At least one chemical is to be fed through said chemical dispenser means 105 into said mixture of water and solid waste 99 inside said enclosed reactor 85.

Said inlet door 82 has to be closed when a gas is to be fed with a gas feeder 94 into said mixture of water and solid waste 99 through said gas inlet pipe 90 and said mixing and gas distribution means 83. The resulting gas effluent 100 is discharged to ambient air 101 through a gas neutralizer 107 and a gas monitor 106. The operation of gas feeding and discharge continues until a predetermined gas reaction period is reached. The operation of gas feeding and discharge in accordance with this invention is optional; therefore this operating step can be bypassed if a gas treatment is not needed for a specific infectious solid waste. The gas used in this invention is selected from a group comprising ozone, chlorine, chlorine, dioxide, air, nitrogen, oxygen, or combinations thereof, depending on the solid wastes.

The mixing and gas distribution means 83 is turned off when chemical and/or gas reaction is complete, so the solid waste can be separated from said mixture of water and solid waste 99 inside said enclosed reactor 85 by gravitational force, resulting in a separated solid waste and a separated water. Alternatively centrifugal force can be used instead of gravitational force inside said enclosed reactor 85 for separation of said solid waste from said mixture 99.

The separated solid waste inside said enclosed reactor 85 is then transported downward to an expulsion chamber means 102 for removal of residual water by compression force applied to said separated solid waste. The dewatered solid waste is pushed out by the discharge mechanism 40 of said expulsion chamber means 102, and stored in a storage means 103, while a wastewater resulting from this compression operation is drained through water drains 65 of said expulsion chamber means 102.

Both said separated water from said enclosed reactor 85, and said wastewater from said expulsion chamber means 102 are discharged to a chemical neutralizer means 123 (FIG. 8) for neutralization, treatment, and subsequent discharge. The chemical neutralizer means 123 can be bypassed or idled if said separated water and said wastewater are allowed to be discharged into the public sewer system 124 or subsequent treatment in a municipal or commercial wastewater treatment plant.

While the present invention has been described with reference to particular embodiments thereof, it will be understood that numerous other minor modifications may be made by those skilled in the art without departing from the scope of the invention. Therefore, the following examples are intended to cover all such equivalent variations as come within the true spirit and scope of the invention. The following are typical alterations and variations which are within the spirit and scope of this invention.

The shape of said enclosed reactor can be rectangular, cubic, cylindrical, round, eggshape, foot-ball shape, or cement-mixer shape.

The mixing and gas distribution means 83 can be one combined means shown in FIGS. 1 and 2 for both mixing and gas distribution, or two separate means: one for mixing alone, and another for gas distribution alone.

Although said inlet door 82 shown in FIGS. 1 and 2 is located on the top of aid enclosed reactor 85, said inlet door can also be located on the side wall 85A.

More than one inlet door 82 can be installed on said enclosed reactor 85 for facilitating feeding or loading said solid waste into said enclosed reactor 85.

If said gas is not to be fed into said enclosed reactor 85, the inlet door(s) can be open or even removed during operation.

One or more access door 87 for repairing said enclosed reactor 85 is an option.

For the purpose of beautification, said water pump 97, said hot water inlet pipe 12, said cold water inlet pipe 14, and said water outlet pipe 88 may all be connected at the bottom 85B of said enclosed reactor 85. More than one water pump 97 can be installed for pumping and/or discharging water.

Figure 4A:
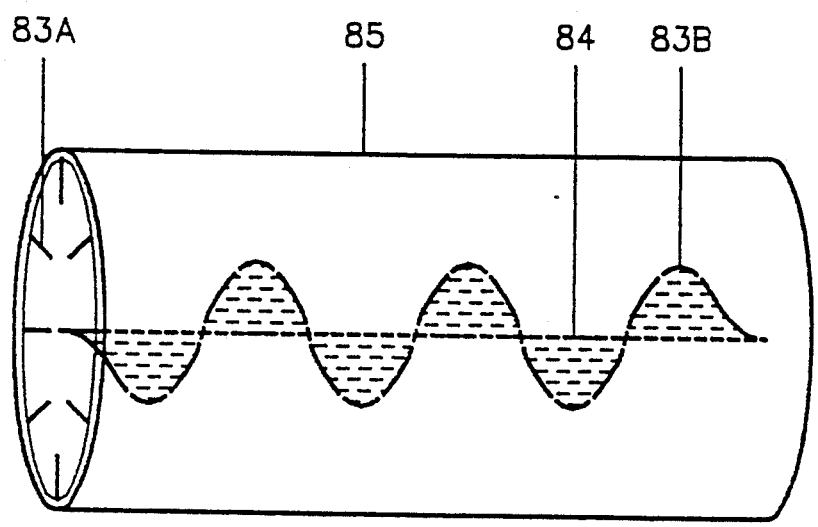
FIG. 4A shows a set of circular-and-screw shape mixing paddles which are horizontally mounted on both an axis and a circumference of a mixing and gas distribution means of said apparatus, according to the present invention.
Figure 4B:
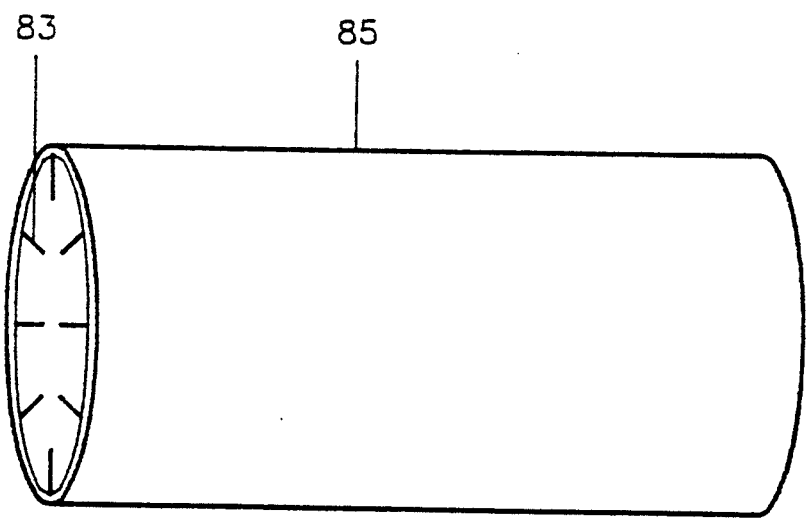
FIG. 4B shows a set of rectangular shape mixing paddles which are horizontally side mounted on a circumference of a mixing and gas distribution means of said apparatus, according to the present invention.
Figure 5A:
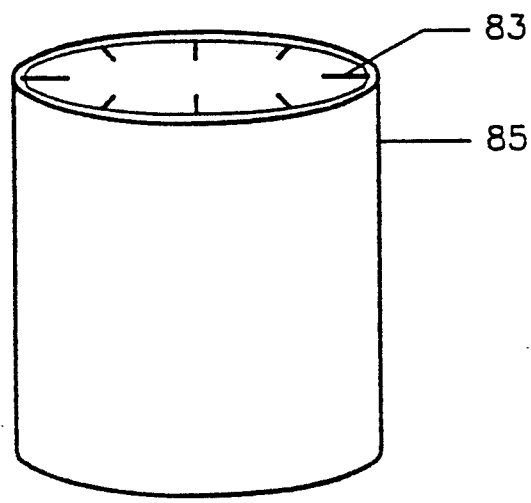
FIG. 5A shows a set of rectangular shape mixing paddles which are vertically side mounted on a circumference of a mixing and gas distribution means of said apparatus, without an axis in the center, according to the present invention.
Figure 5B:
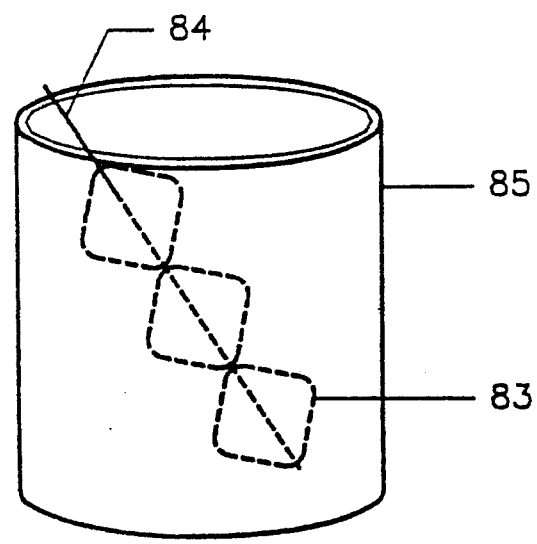
FIG. 5B shows a set of square shape mixing paddles which are inclined side mounted on a wall of a mixing and gas distribution means of said apparatus, according to the present invention.
Figure 6A:
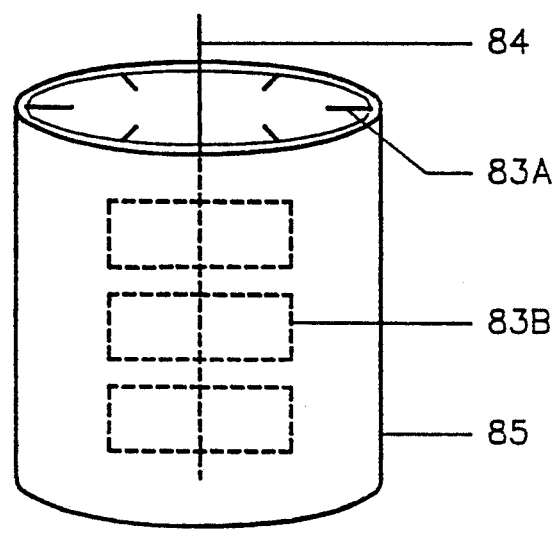
FIG. 6A shows a set of rectangular shape mixing paddles which are side-and-center as well as vertically mounted on a mixing and gas distribution means of said apparatus, according to the present invention.
Figure 6B:
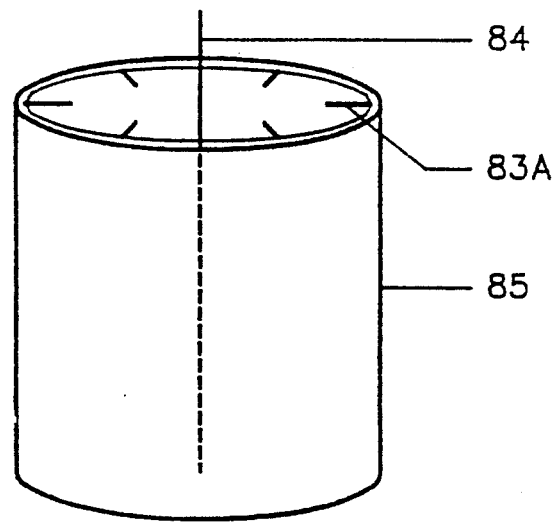
FIG 6B shows a set of rectangular shape mixing paddles which are vertically side mounted on a circumferential of a mixing and gas distribution means of said apparatus, with an axis in the center, according to the present invention.
Figure 7A:
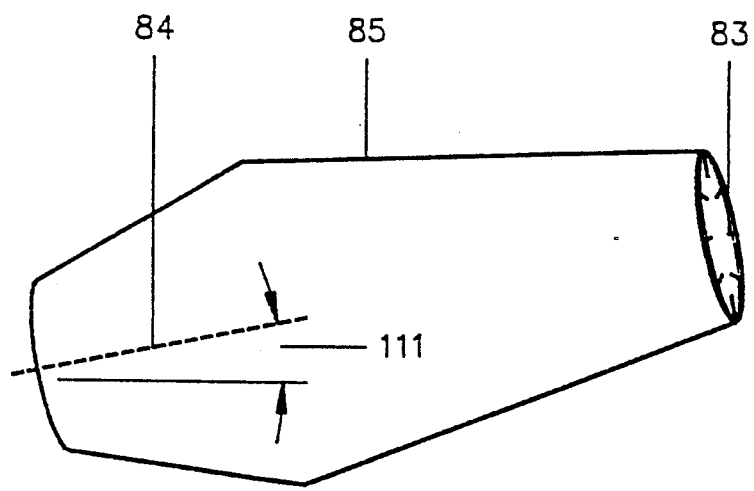
FIG. 7A shows a set of mixing paddles which are inclined side mounted on a circumference of a mechanically rotating non-cylindrical mixing and gas distribution means of said apparatus, with an axis in the center, according to the present invention.
Figure 7B:
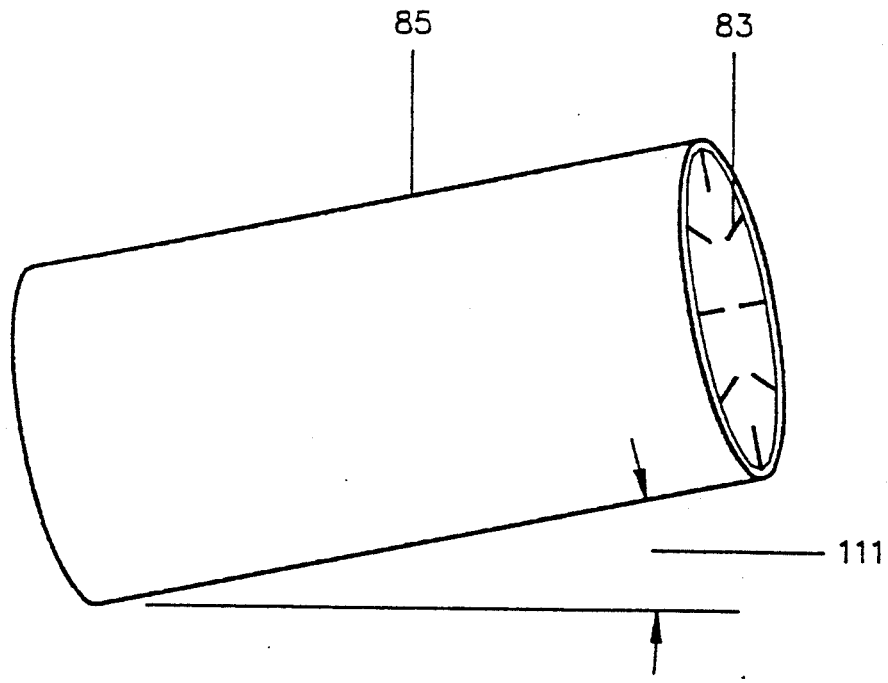
FIG. 7B shows a set of rectangular shape mixing paddles which are inclined side mounted on a circumference of a mechanically rotating cylindrical mixing and gas distribution means of said apparatus, without an axis in the center, according to the present invention.

Said mixing and gas distribution means 83 may be top and center mounted as shown in FIGS. 1, 2, and 3A, or bottom and center mounted (FIG. 3B), or side and horizontal mounted (FIGS. 4A and 4B) or normal side mounted (FIGS. 5A and 5B), or side and center mounted (FIG. 6A), or inclined side mounted (FIGS. 7A and 7B).

There can be more than one mixing and gas distribution means 83, or 83A, or 83B inside said enclosed reactor 85.

The shape of mixing paddles (flights) of said mixing and gas distribution means 83, or 83A, or 83B can be oval, square (FIGS. 3A and 3B), rectangular (FIG. 6A), circular, screw (FIG. 4A), or combinations thereof in shape. Said mixing paddles are mounted on an axis (FIGS. 1A, 3A, 3B, and 5B) or on a circumference (FIGS. 4B, 5A, 6B, 7A, and 7B), or on both an axis and a circumference (FIGS. 4A and 6A).

Said expulsion chamber means 102 is commercially available and similar to that disclosed in the U.S. Pat. No. 3,887,470, which was issued to R. E. Weber and C. J. Zimmermann, on Jun. 3, 1975, except that the U.S. Pat. No. 3,887,470 adopts a conveyor with screw driven and centered V-rams, but the present invention (shown in FIGS. 1 and 2) adopts a centerless conveyor with spiral flights, so the clogging problem can be avoided. Alternatively, any commercially available screw conveyor-compactor (either centered or centerless) can be adopted (M. Krofta and L. K. Wang, Journal NEWWA, pages 277–278, Sept. 1985; Chemical Equipment, Information #577, page 112, Vol. 30, No. 7, November 1991; Walter and Waste Digest 1992 Buyers' Guide "Rotary Screw Compactor", cover, June 1992) for expulsion and dewatering of the separated solid waste from said enclosed reactor 85. In operation, the screw conveyor 60 rotates clockwise, transporting said treated solid waste to one end, squeezing out the residual water originally in said treated solid waste from said water drains 65 and discharging the squeezed out water from a water outlet 68. Subsequently, the dewatered solid waste is discharged by a rotating discharge means 72 at one end, and the screw conveyor 60 starts to rotate counterclockwise, moving a new batch of treated solid waste to an opposite end for similar compacting/dewatering and discharge operations.

Each said expulsion chamber means 102 comprises a motor 62, a conveyor means 60, at least one compactor means 30, water drains 65, at least one water outlet 68, and at least one rotating discharge means 72. Double compactor means 30, water outlets 65, and rotating discharge means 72 ensure continuous expulsion and compacting/dewatering operation.

In summation, said expulsion chamber means 102 of this invention adopts a centerless conveyor with spiral flights (FIG. 1), or a conveyor with screw driven and centered V-rams (U.S. Pat. No. 3,887,470) or a conventional conveyor with both center axis and spiral flights, or combinations thereof, and is either attached (FIGS. 1 and 2) or detached (see FIGS. 7A and 7B that the enclosed reactor 85 may rotate and discharge the treated solid waste into a detached expulsion chamber means 102) to said enclosed reactor 85.

The entire apparatus of this invention is skid mounted, or truck mounted, or free standing, and can be manually operated or automatically operated.

Under certain operating conditions that there is no need to have gas distribution, said mixing and gas distribution means 83, or 83A, or 83B provides mixing alone, its means for gas distribution as well as other gas process equipment (including said gas inlet pipe, said gas feeder, said gas release valve, said vacuum/pressure gauge, aid gas outlet pipe, gas monitor, and said gas neutralizer) can be idled, disconnected, or bypassed.

Said enclosed reactor 85 is either stationary (FIGS. 1 and 2) or movable (FIGS. 7A and 7B, for instance) by mechanical means for loading or expulsion operation.

The enclosure 85A of said enclosed reactor 85 is stationary (FIGS. 1 and 2), or mechanically rotatable (FIGS. 7A and 7B, for instance) during mixing operation.

Figure 3B:
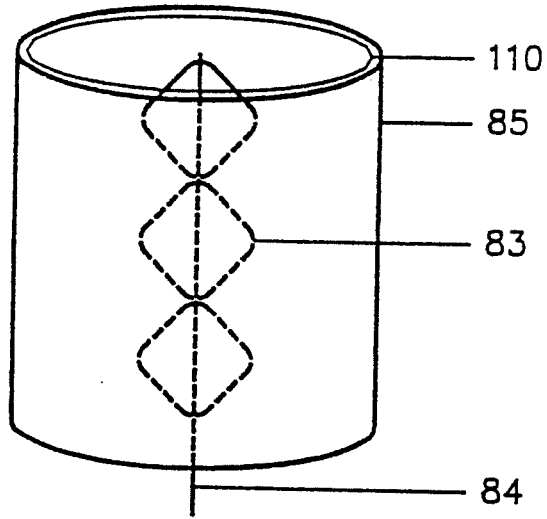
FIG. 3B shows a set of square shape mixing paddles which are bottom-and-center as well as vertically mounted on a mixing and gas distribution means of said apparatus, according to the present invention.

The apparatus of this invention wherein said expulsion chamber means 102 can be replaced or assisted by an alternative expulsion means comprising a perforated inner chamber 110 inside said enclosed reactor 85 and being mechanically rotatable for dewatering aid solid waste by centrifugal force, as shown in FIGS. 3A and 3B.

Alternatively, said expulsion chamber means 102 can also be replaced or assisted by an alternative expulsion means comprising a compactor and a perforated flat drain both inside said enclosed reactor and being mechanically operated for dewatering by compressive force and subsequently discharging said solid waste.

The process water (said separated water, said wastewater, or the neutralized water) from the apparatus of this invention contains quaternary ammonium compound, thus contains nitrogen. If either the solid waste or the neutralizing chemical used in said chemical neutralizer means contains phosphorus, the process water will contain both nitrogen and phosphorus, in turn, can be recovered as a fertilizer or a fertilizer aid.

Figure 8:
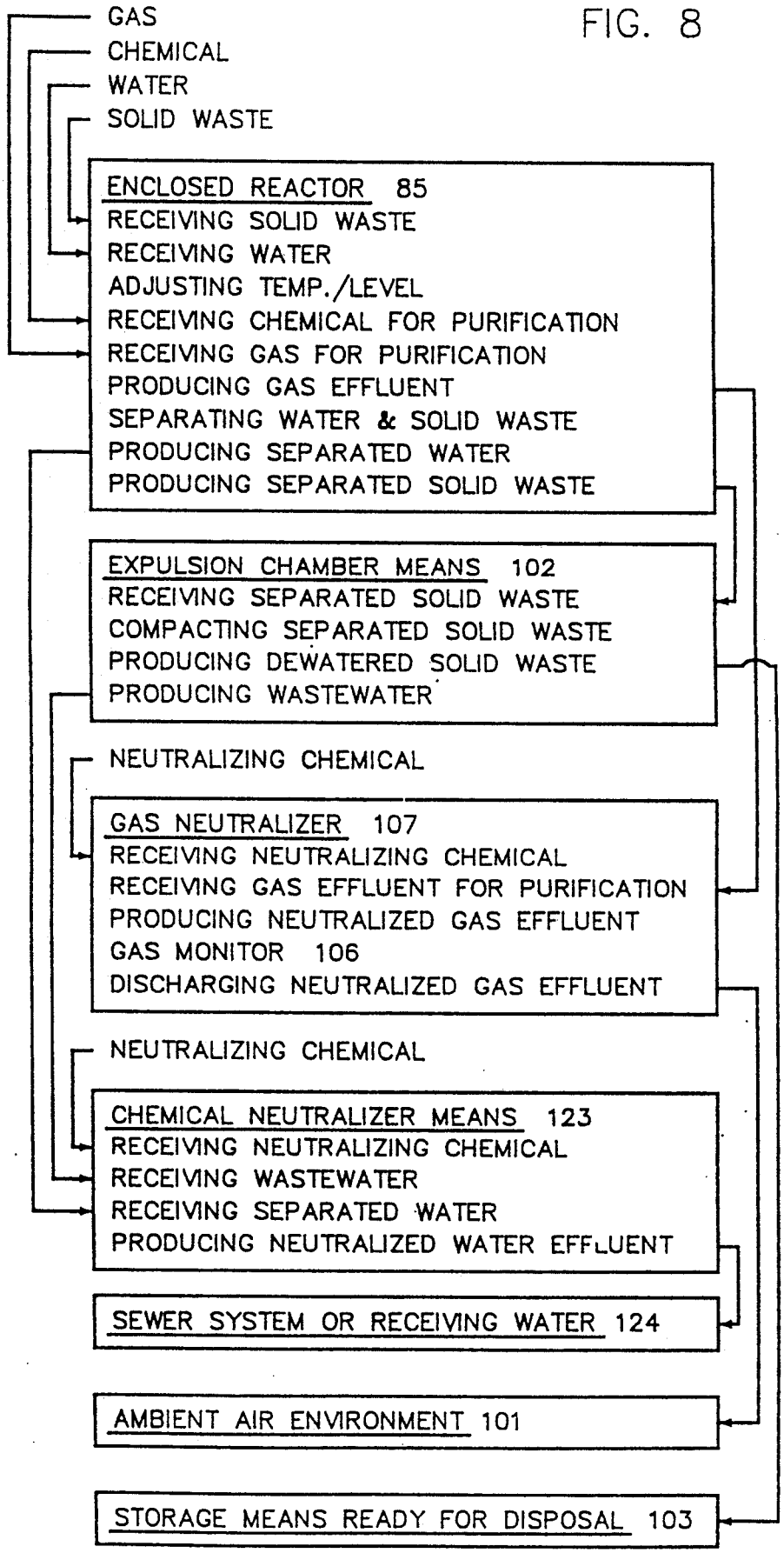
FIG. 8 shows a process flow diagram for operating said apparatus of the present invention.

The process of this invention is either a sequencing batch process or a continuous process, shown in FIG. 8.

The apparatus of this invention wherein said enclosed reactor 85 can be further equipped with heating elements and insulation inside said enclosure 85A, and a thermostat (not shown) for added temperature control.

Said gas neutralizer 107 is a small reactor containing at least one neutralizing chemical for removal of chlorine, chlorine dioxide, carbon monoxide, carbon dioxide, odorous gas, methane, etc.) from said gas effluent (see FIGS. 1 and 2) by neutralization reactions.

Said chemical neutralizer means 123 (FIG. 8) is also a small reactor containing at least one neutralizing chemical for removal of residual chemical (such as base, lime, coagulants, cationic surface active agent, etc.) from the process water (such as the separated water and wastewater by neutralization reactions.

The neutralizing chemical of this invention used for removal of chlorine, chlorine dioxide, ozone, hypochlorite, bromine, permanganate, peroxide by either said gas neutralizer or said chemical neutralizer means is selected form a group of reducing agents comprising sodium bisulfite ($NaHSO_3$), sodium sulfite ($Na_2SO_3$), sodium thiosulfate ($Na_2S_2O_3$), activated carbon (C), or combinations thereof.

The neutralizing chemical of this invention used for neutralizing residual cationic surface agents (including quaternary ammonium compounds) in the process water is selected from a group of chemicals comprising anionic synthetic detergents, soaps, coagulants, activated carbon, or combinations thereof.

The neutralizing chemical of this invention used for absorbing methane gas is alcohol. Activated carbon is very effective for removal of odorous gas present in said gas effluent 100.

Any acid, carbon dioxide, or carbon monoxide, produced or present in said enclosed reactor 85 is to be neutralized by a base; while any base or lime present in said enclosed reactor 85 is to be neutralized by an acid.

Chemical method is generally used for processing a contaminated soil, a spent animal bedding, or spent diapers.

In case of processing a slurry of highly concentrated biosolids with high nitrate content (including but not limited to activated sludge), the apparatus of this invention shown in FIGS. 1 and 2 or equivalent can be operated according to either said chemical method or a biochemical method, described below.

A chemical method for purifying and compacting a solid waste (a highly concentrated biosolid slurry, a contaminated soil, a spent animal bedding, or spent diapers) comprises the following steps (see FIG. 8):

(a) opening an inlet door 82 or inlet pipe 82A of an enclosed reactor 85, and placing a solid waste manually or mechanically into said enclosed reactor 85 which is equipped with said inlet door 82, said inlet pipe 82A, side walls 85A, a bottom 85B, a top 85C, a cold water inlet pipe 14, a hot water inlet pipe 12, a water outlet pipe 88, water drains 6, a gas inlet pipe 90, a gas outlet pipe 91, a gas release valve 92, a mixing and gas distribution means 83, a chemical dispenser means 105, a vacuum/pressure gauge 93, a gas feeder 94, a timer control means 95, a temperature gauge 96, and a water pump 97, (b) adjusting water temperature and water level inside said enclosed reactor 85 until a predetermined water temperature and a predetermined water level 98 inside said enclosed reactor 85 is reached, thereby producing a mixture of water and solid waste 99, (c) continuously mixing said mixture of water and solid waste 99 inside said enclosed reactor 85 with said mixing and gas distribution means 83, (d) batchwise feeding at least one chemical through said chemical dispenser means 105, into said mixture of water and solid waste 99 inside said enclosed reactor 85, (e) being sure that said inlet door 82 is now closed, (f) feeding, when necessary, a gas with said gas feeder 94, into said mixture of water and solid waste 99 inside said enclosed reactor 85, through said gas inlet pipe 90 and said mixing and gas distribution means 83, and discharging the gas effluent 100 to ambient air 101 through a gas neutralizer 107 and a gas monitor 106, until a predetermined gas reaction period is reached, (g) stop mixing by turning off said mixing and gas distribution means 83, (h) separating said solid waste from said mixture of water and solid waste 99 inside said enclosed reactor 85 by gravitational and/or centrifugal force, thereby producing a separated solid waste and a separated water, (i) transporting the separated solid waste to an expulsion chamber means 102 for dewatering said separated solid waste, thereby producing a dewatered solid waste and a wastewater, (j) discharging the dewatered solid waste from said expulsion chamber means 102 into a storage means 103, and (k) draining said separated water and said wastewater through said water outlet pipe 88 and said water drains 6 65 and 68, to a chemical neutralizer means 123 for neutralization, treatment, and subsequent discharge.

Said inlet pipe 82A and said inlet door 82 are for feeding slurry solid waste (such as highly concentrated biosolid slurry) and bulky solid waste (such as spent diapers), respectively.

When processing a contaminated soil, a spent animal bedding, or spent diapers, feeding hot water and/or cold water into said enclosed reactor 85 is generally used for adjusting water temperature and water level 98 inside said enclosed reactor 85. However, when processing a slurry of highly concentrated biosolids, heating elements and a thermostat are to be used for adjusting water temperature, and the slurry level is to be the water level in said enclosed reactor 85.

In general, when at least one chemical (such a quaternary ammonium compound or an equivalent disinfectant as well as cleaning agent) is fed, a gas needs not to be fed; or when a gas (such as ozone or an equivalent gas) is fed, a chemical needs not to be fed, if the aforementioned chemical method is adopted for total disinfection and cleaning.

In other words, all pathogenic microorganisms originally in said solid waste (such as a contaminated soil, a spent animal bedding, spend diapers, or a slurry of highly concentrated biosolids) are to be killed by the chemical method of this invention. The gravitational force allows said solid waste to settle, and the separated water is a supernatant inside said enclosed reactor 85. The chemically disinfected solid waste is then dewatered for volume reduction and subsequent sanitary disposal.

The biochemical method of this invention is an anaerobic biological flotation process named by the inventors and specifically developed for thickening said biosolid slurry using the same apparatus of this invention. The procedures of said biochemical method is identical to that of said chemical method described earlier, except the following: (1) said at least one chemical in step d is a carbonaceous substance, a coagulant, or a nutrient (N&P); (2) said gas in step f is an inert gas, such as nitrogen for depleting dissolved oxygen in said biosolid slurry when necessary; (3) said gas effluent in step f contains nitrogen, carbon dioxide, and a small amount of methane; (4) said gas neutralizer 107 in step f uses alcohol for absorption of methane gas in said gas effluent 100; (5) said gravitational force in step h is flotation force that biosolids are floated upward; and (6) said separated water in step h is a subnatant in said enclosed reactor 85.

During said biological flotation operation for thickening a biosolid slurry in accordance with the biochemical method of this invention, the following two biochemical reactions occur assuming the added chemical (carbonaceous substance) is methanol ($CH_3OH$):

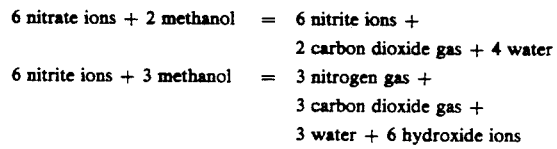

The two equations above can also be written as a summary biochemical reaction as follows:

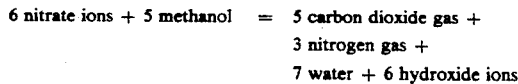

The nitrate content as well as microorganisms (anaerobic and facultative) in a biosolid slurry are usually sufficient to carry out the above biochemical reactions in the absence of oxygen. Methanol is an excellent carbonaceous substance to be used in this invention; however, other carbonaceous substances, such as soluble starch, ethanol, sugar, etc. are also effective for biological flotation in which extremely fine nitrogen gas bubbles and carbon dioxide gas bubbles are formed to float the biosolids upward in laminar hydraulic flow region.

In accordance with the present invention, the microorganisms in said biosolid slurry are kept alive during the course of the above biochemical reactions. After the biochemical reactions are over in said enclosed reactor 85, the subnatant which is the clarified effluent water is drained first, then the floating biosolids (i.e. floating scums) are disinfected with a quaternary ammonium compound, and conditioned with a coagulant or lime, and discharged to said expulsion chamber means 102 for further dewatering operation.

Both nitrogen and carbon dioxide gas bubbles produced in said biological flotation are harmless. A small amount of methane gas produced is absorbed by alcohol, and can also be removed by chlorine and bromine if said gas neutralizer 107 is lighted.

A biochemical method for thickening a biosolid slurry using an anaerobic biological flotation process comprises the following steps in sequence.

(a) starting the first step (Fill Phase) by feeding said biosolid slurry, a carbonaceous substance and a coagulant, as needed, to an enclosed reactor 85 and gently mixing the mixture of said biosolid flurry, said carbonaceous substance and said coagulant in the absence of dissolved oxygen, but in the presence of nitrate ions, anaerobic microorganisms, and facultative microorganisms, (b) stopping the first step (Fill Phase) and starting the second step (Flotation Phase) by stopping the feeding and mixing operations in said enclosed reactor 85 for biochemical reactions among nitrate, carbonaceous and microorganisms to take place, in order to produce extremely fine nitrogen bubbles and carbon dioxide bubbles under laminar hydraulic conditions, in turn, to float said biosolids upward inside said enclosed reactor 85, forming floating scums, and to release a gas effluent 100 to ambient air environment 101 through a gas neutralizer 107 and a gas monitor 106, (c) stopping the second step (Flotation Phase) and starting the third step (Decant Phase) for discharge of flotation clarified effluent (subnatant) near but above reactor bottom, to a chemical neutralizer means 123 for treatment, without disturbing the floating scums on the top, (d) stopping the third step (Decant Phase) and starting the fourth step (Sludge Conditioning and Discharge Phase) by adding at least one chemical to said floating scums during mixing for disinfection and conditioning, and discharging the chemically treated scums to an expulsion chamber means 102, (e) stopping the fourth step (Sludge Conditioning and Discharge Phase) and starting the fifth step (Sludge Dewatering Phase) by removing residual water from the chemically treated scums by compaction with said explusion chamber means 102, forming a wastewater and a dewatered sludge; discharging said wastewater to said chemical neutralizer means 123 for treatment, and discharging said dewatered sludge to a storage means 103 ready for final sanitary disposal, and (f) repeating another cycle starting the first step (Fill Phase) again for thickening raw biosolid slurry.

What is claimed is:

1. An apparatus for purifying and dewatering an infectious and hazardous solid waste comprising in combination:

(a) an enclosed reactor comprising an enclosure having a top, side walls, a bottom outside wall, an inlet door and an inlet pipe on or near the top thereof for receiving said solid waste, said apparatus comprising means for purifying, dewatering and separating said solid waste thereby producing a purified separated solid waste and a separated water, (b) a water pump and a hot water inlet pipe connected to said enclosure for feeding hot water into said enclosed reactor, (c) a water pump and a cold water inlet pipe connected to said enclosure for feeding cold water into said enclosed reactor, (d) a water pump and a water outlet pipe connected to said enclosure for discharging said separated water from said enclosed reactor to a chemical neutralizer, (e) a gas inlet pipe and a gas feeder both connected to said enclosure for feeding a gas or a gas mixture into said enclosed reactor, (f) a chemical dispenser means connected to said enclosure for dispensing and feeding a predetermined amount of a chemical into said enclosed reactor, (g) a mixing and gas distribution mean positioned within said enclosed reactor for mixing said water, said solid waste, and said chemical, and for distributing/mixing said gas or gas mixture inside said enclosed reactor for purifying said solid waste, (h) a gas release valve connected to said enclosure for discharging an excess amount of said gas into a gas neutralizer when a predetermined pressure for operating said enclosed reactor has been exceeded, (i) a vacuum/pressure gauge connected to said enclosed reactor for determining pressure or vacuum inside said enclosed reactor, (j) a gas outlet pipe connected to said enclosure for exiting said gas from said enclosed reactor, (k) a gas neutralizer connected to said gas outlet pipe for neutralizing said gas exiting from said enclosed reactor by means of at least one neutralizing chemical, thereby producing a neutralized gas, (l) a gas monitor connected to said gas neutralizer for monitoring residual toxic contaminants in said neutralized gas before discharged said neutralized gas into ambient air environment, (m) means for transporting said water to, within or from said enclosed reactor comprising said water pumps, hot water inlet pipe, cold water inlet pipe, water outlet pipe and water drains, (n) an expulsion chamber means for receiving and dewatering said purified separated solid waste from said enclosed reactor, thereby producing a dewatered purified solid waste and a wastewater, (o) a storage means connected to said expulsion chamber means for receiving and storing the dewatered purified solid waste, (p) a chemical neutralizer means connected to said water outlet pipe and water drains for receiving and treating said separated water and said wastewater using at least one neutralizing chemical, and for subsequently discharging a neutralized and treated water, (q) a timer control means mounted on said enclosure and electrically connected to said water pumps, said gas feeder, said chemical dispenser means, said mixing and gas distribution means, said expulsion chamber means, and said chemical neutralizer means for automatic or semi-automatic control of said apparatus at different operating cycles in a sequence, each cycle with predetermined and pre-programmed time intervals, and (r) a temperature gauge for determining the water temperature inside said enclosed reactor.

2. The apparatus of claim 1 wherein said mixing and gas distribution means comprises combined means for both mixing and gas distribution, or separate means for mixing and another means for gas distribution.

3. The apparatus of claim 1 comprising plural mixing and gas distribution means positioned within said enclosed reactor.

4. The apparatus of claim 1 comprising one or more of said inlet doors, and one or more of said inlet pipes, and one or more access doors.

5. The apparatus of claim 1 wherein said expulsion chamber means is selected from the group consisting of a centerless conveyor with spiral flights, a conveyor with screw-driven and centered V-rams, and a conveyor with both center axis and spiral flights, and combinations thereof.

6. The apparatus of claim 1 wherein said expulsion chamber means comprises a motor, conveyor means, at least one compactor means, water drains, at least one water outlet, and at least one rotating discharge means.

7. The apparatus of claim 1 wherein said mixing and gas distribution means comprises means for mixing alone with no gas distribution when gas distribution process equipment are idled, disconnected, or bypassed.

8. The apparatus of claim 1 further comprising means for mechanically rotating the enclosure of said enclosed reactor during mixing of said water and said solid waste.

9. The apparatus of claim 1 wherein said expulsion chamber means comprises a perforated inner chamber inside said enclosed reactor means for mechanically rotating said inner chamber for dewatering said solid waste by centrifugal force.

10. The apparatus of claim 1 wherein said expulsion chamber means comprises a compactor and a perforated flat drain both inside said enclosed reactor and being mechanically operated for dewatering by compressive force and further comprising means for subsequent discharge of said solid waste.

11. The apparatus of claim 1 wherein said enclosed reactor further comprises heating elements, insulation, and a thermostat for temperature control.

12. The apparatus of claim 1 wherein said gas neutralizer and said chemical neutralizer means comprise neutralizing chemicals selected from the group consisting of sodium bisulfite, sodium sulfite, sodium thiosulfate, activated carbon, anionic synthetic detergents, soaps, coagulants, acids, bases, alcohols, and combinations thereof.

* * * * *